United States Patent
Lee et al.

(10) Patent No.: US 10,525,665 B2
(45) Date of Patent: Jan. 7, 2020

(54) METHOD OF PREPARING A MELTBLOWN FIBER WEB

(71) Applicants: IKSUNG CO., LTD., Chungcheongbuk-do (KR); Hun Joo Lee, Gyeonggi-do (KR); Kee Wook Yang, Chungcheongbuk-do (KR)

(72) Inventors: Hun Joo Lee, Gyeonggi-do (KR); Kee Wook Yang, Chungcheongbuk-do (KR); Jong Hyuk Cha, Chungcheongbuk-do (KR); Gue Ssuk Kang, Chungcheongbuk-do (KR); Chang Hyeon Kim, Chungcheongbuk-do (KR)

(73) Assignees: IKSUNG CO., LTD., Chungcheongbuk-do (KR); Hun Joo Lee, Gyeonggi-do (KR); Kee Wook Yang, Chungcheongbuk-do (KR)

( * ) Notice: Subject to any disclaimer, the term of this patent is extended or adjusted under 35 U.S.C. 154(b) by 77 days.

(21) Appl. No.: 15/865,134

(22) Filed: Jan. 8, 2018

(65) Prior Publication Data

US 2018/0134003 A1    May 17, 2018

Related U.S. Application Data

(62) Division of application No. 14/439,461, filed as application No. PCT/KR2013/009354 on Oct. 18, 2013, now abandoned.

(30) Foreign Application Priority Data

Nov. 6, 2012  (KR) .................. 10-2012-0125016

(51) Int. Cl.
B32B 3/26  (2006.01)
B32B 5/02  (2006.01)
(Continued)

(52) U.S. Cl.
CPC ............... B32B 5/26 (2013.01); B29C 48/21 (2019.02); B32B 3/263 (2013.01); B32B 5/022 (2013.01);
(Continued)

(58) Field of Classification Search
CPC ............... B29C 48/21; B29L 2009/00; B29L 2031/721; B32B 3/26; B32B 3/263;
(Continued)

(56) References Cited

U.S. PATENT DOCUMENTS 4,118,531 A   10/1978  Hauser
5,641,555 A    6/1997  Berrigan et al.
(Continued)

FOREIGN PATENT DOCUMENTS

CA     2 166 612 C     2/1995
CN     101724982 A     6/2010
(Continued)

OTHER PUBLICATIONS

Mar. 27, 2017 Office Action issued in European Application No. 13 853 540.6.
(Continued)

*Primary Examiner* — Leo B Tentoni
(74) *Attorney, Agent, or Firm* — Nixon & Vanderhye P.C.

(57) ABSTRACT

A waved meltblown fiber web of the present invention relates to a fiber web prepared by a meltblown method and is characterized by a preparation method in which a meltblown microfiber comes in contact with collection portions having different surface velocities so as to be collected. The waved meltblown fiber web of the present invention is characterized in that: a part of meltblown microfibers reaches a low velocity collection portion so as to be horizontally layered, thereby forming a horizontal fiber layer (10); another part of the meltblown microfibers reaches a
(Continued)

high velocity collection portion of which the surface velocity is greater that of the low velocity collection portion so as to form a serpentine vertical fiber layer (20); and the upper end of the vertical fiber layer (20) becomes entangled so as to form a wave shaped wave layer (30) forming the uppermost portion of the fiber web.

7 Claims, 11 Drawing Sheets

(51) Int. Cl.
| | |
|---|---|
| B32B 5/12 | (2006.01) |
| D04H 3/002 | (2012.01) |
| D04H 3/004 | (2012.01) |
| D04H 3/007 | (2012.01) |
| D04H 3/009 | (2012.01) |
| D04H 3/011 | (2012.01) |
| D04H 3/015 | (2012.01) |
| D04H 3/016 | (2012.01) |
| B32B 5/26 | (2006.01) |
| D04H 1/559 | (2012.01) |
| D01D 5/098 | (2006.01) |
| D04H 1/4382 | (2012.01) |
| D04H 1/56 | (2006.01) |
| D04H 1/724 | (2012.01) |
| D04H 1/74 | (2006.01) |
| D04H 1/736 | (2012.01) |
| D04H 1/4291 | (2012.01) |
| D04H 1/76 | (2012.01) |
| D04H 11/04 | (2006.01) |
| B29C 48/21 | (2019.01) |
| B32B 37/15 | (2006.01) |

(52) U.S. Cl.
CPC ......... *B32B 37/153* (2013.01); *D01D 5/0985* (2013.01); *D04H 1/4291* (2013.01); *D04H 1/4382* (2013.01); *D04H 1/559* (2013.01); *D04H 1/56* (2013.01); *D04H 1/724* (2013.01); *D04H 1/736* (2013.01); *D04H 1/74* (2013.01); *D04H 1/76* (2013.01); *D04H 11/04* (2013.01); *B32B 2262/02* (2013.01); *B32B 2262/06* (2013.01); *B32B 2262/10* (2013.01); *B32B 2305/22* (2013.01); *Y10T 428/24612* (2015.01)

(58) Field of Classification Search
CPC .. B32B 5/02; B32B 5/022; B32B 5/12; B32B 5/26; B32B 37/14; B32B 37/15; B32B 37/153; B32B 2250/02; B32B 2250/03; B32B 2250/20; B32B 2262/02; B32B 2262/06; B32B 2262/10; B32B 2305/22; B32B 2307/10; B32B 2307/102; D01D 5/098; D01D 5/0985; D01D 7/00; D04H 1/4218; D04H 1/4242; D04H 1/4266; D04H 1/4291; D04H 1/4334; D04H 1/435; D04H 1/559; D04H 1/56; D04H 1/565; D04H 1/736; D04H 1/74; D04H 3/002; D04H 3/004; D04H 3/007; D04H 3/009; D04H 3/011; D04H 3/015; D04H 3/16; D04H 5/06; D04H 5/12

USPC .... 264/103, 172.19, 173.12, 173.14, 173.16, 264/173.19, 211.12, 518, 555; 156/167, 156/181, 244.25

See application file for complete search history.

(56) References Cited

U.S. PATENT DOCUMENTS

| 6,867,156 B1 | 3/2005 | White et al. |
|---|---|---|
| 2003/0213109 A1 | 11/2003 | Neely et al. |
| 2016/0175170 A1* | 6/2016 | Close .................. D04H 1/56 604/385.01 |

FOREIGN PATENT DOCUMENTS

| EP | 0 893 517 A2 | 1/1999 |
|---|---|---|
| EP | 1 234 906 A1 | 8/2002 |
| EP | 1 637 317 A1 | 3/2006 |
| JP | 11-131347 | 5/1999 |
| JP | 11-256464 | 9/1999 |
| KR | 10-0349487 | 11/2002 |
| KR | 10-2004-0025660 | 3/2004 |
| WO | WO 95/05232 A1 | 2/1995 |
| WO | WO 00/66057 A1 | 11/2000 |
| WO | WO 2011/112311 A1 | 9/2011 |

OTHER PUBLICATIONS

May 23, 2016 Supplementary Search Report issued in European Application No. 13 853 540.6.
Nov. 29, 2013 International Search Report for PCT/KR2013/009354 (6 pages).
Nov. 30, 2016 Office Action mailed in CN Application No. 201380003584.1 (with English translation).
Xin et al., "The Application of Melt-Blown/Dry-Laid Composite Web in Automobile Sound-Absorbing Material and its Process" Synthetic Fiber in China (2012, 41, 3) (English Abstract and discussed in CN Office Action).

* cited by examiner

[FIG. 1a]
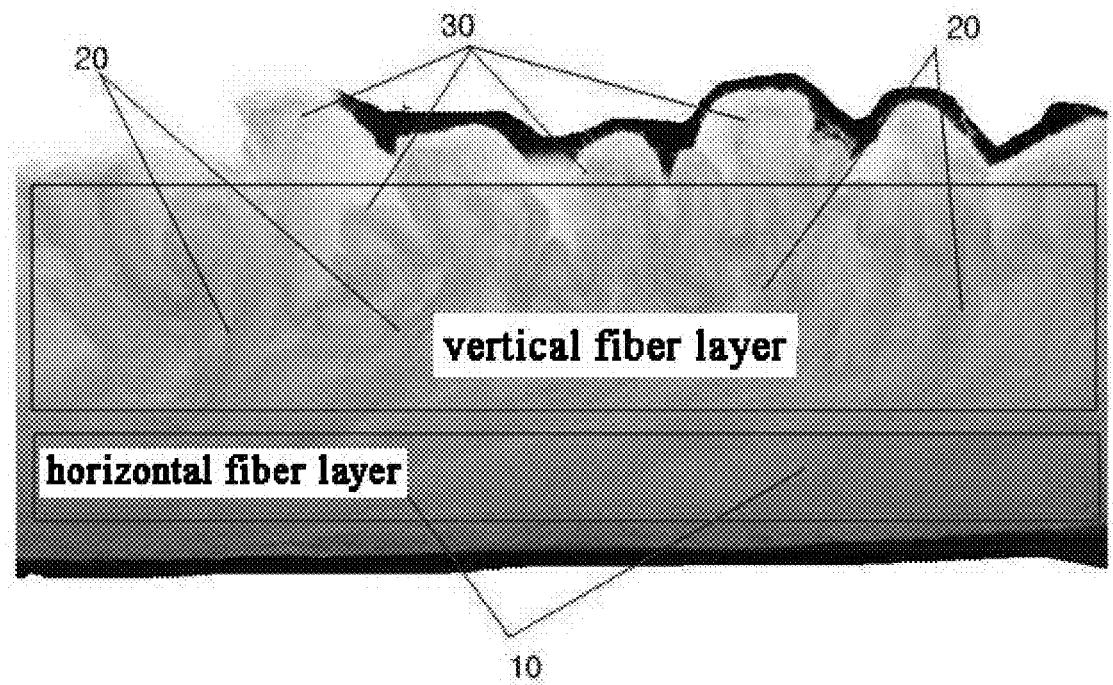
[FIG. 1b]
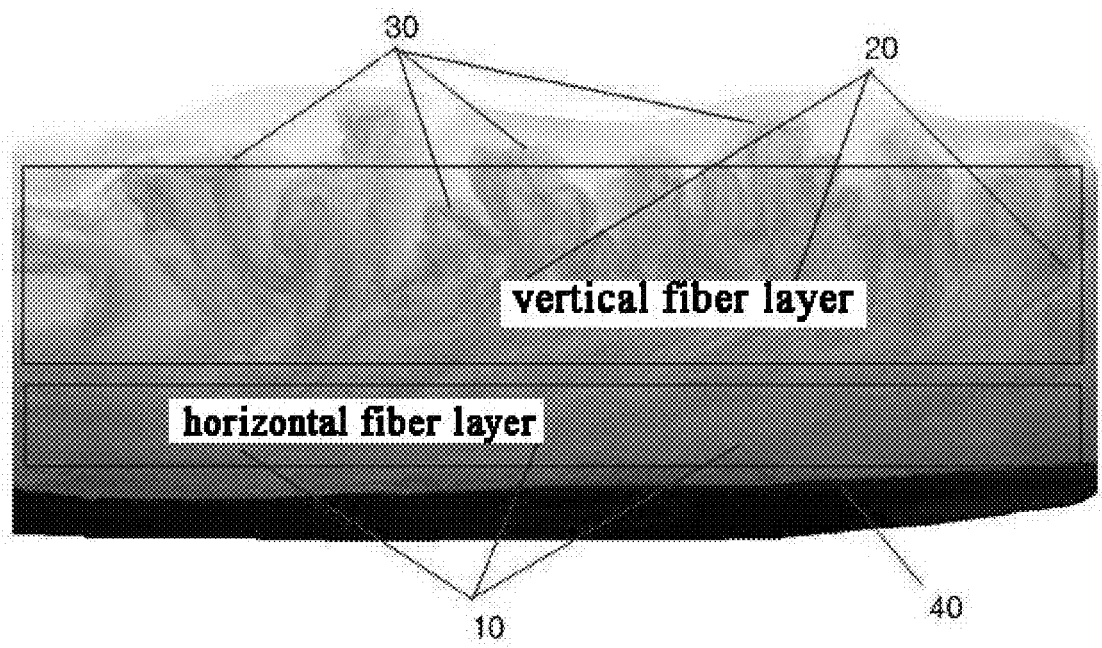

[FIG. 2a]
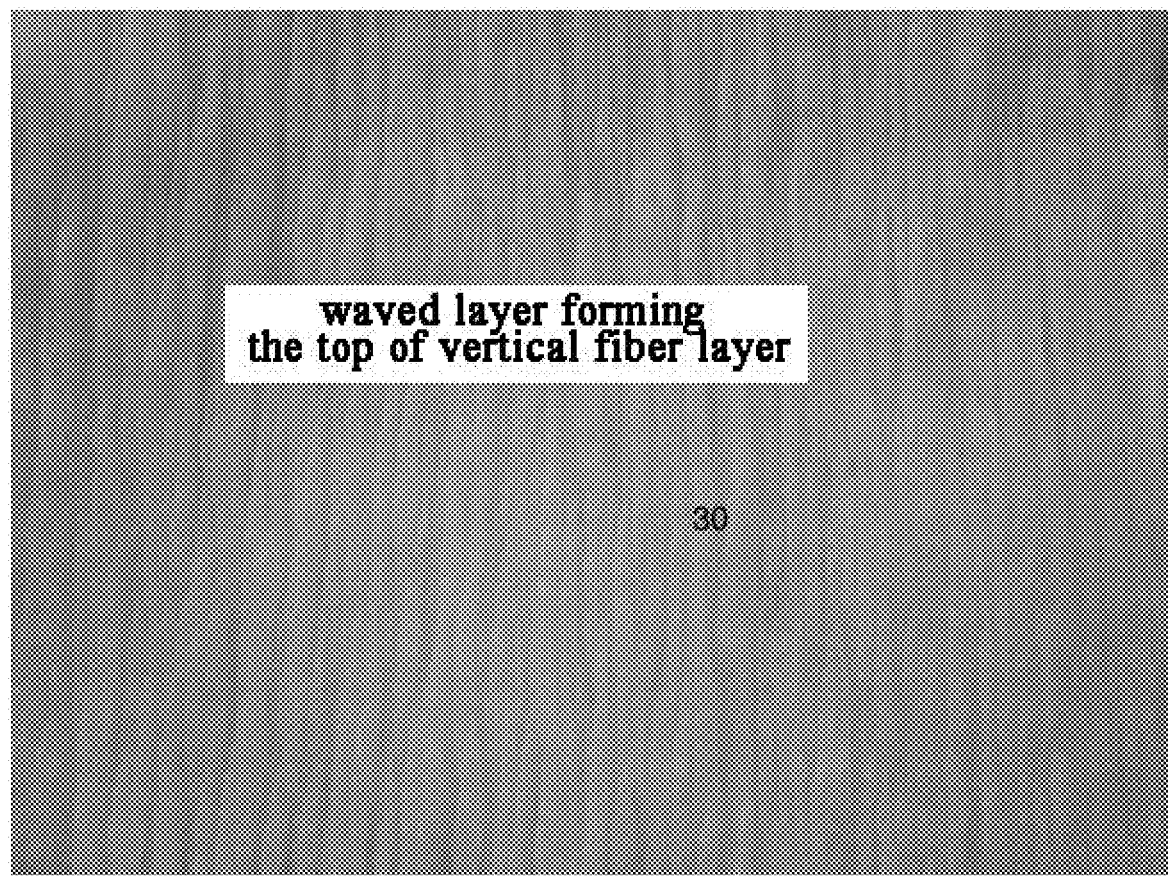

[FIG. 2b]
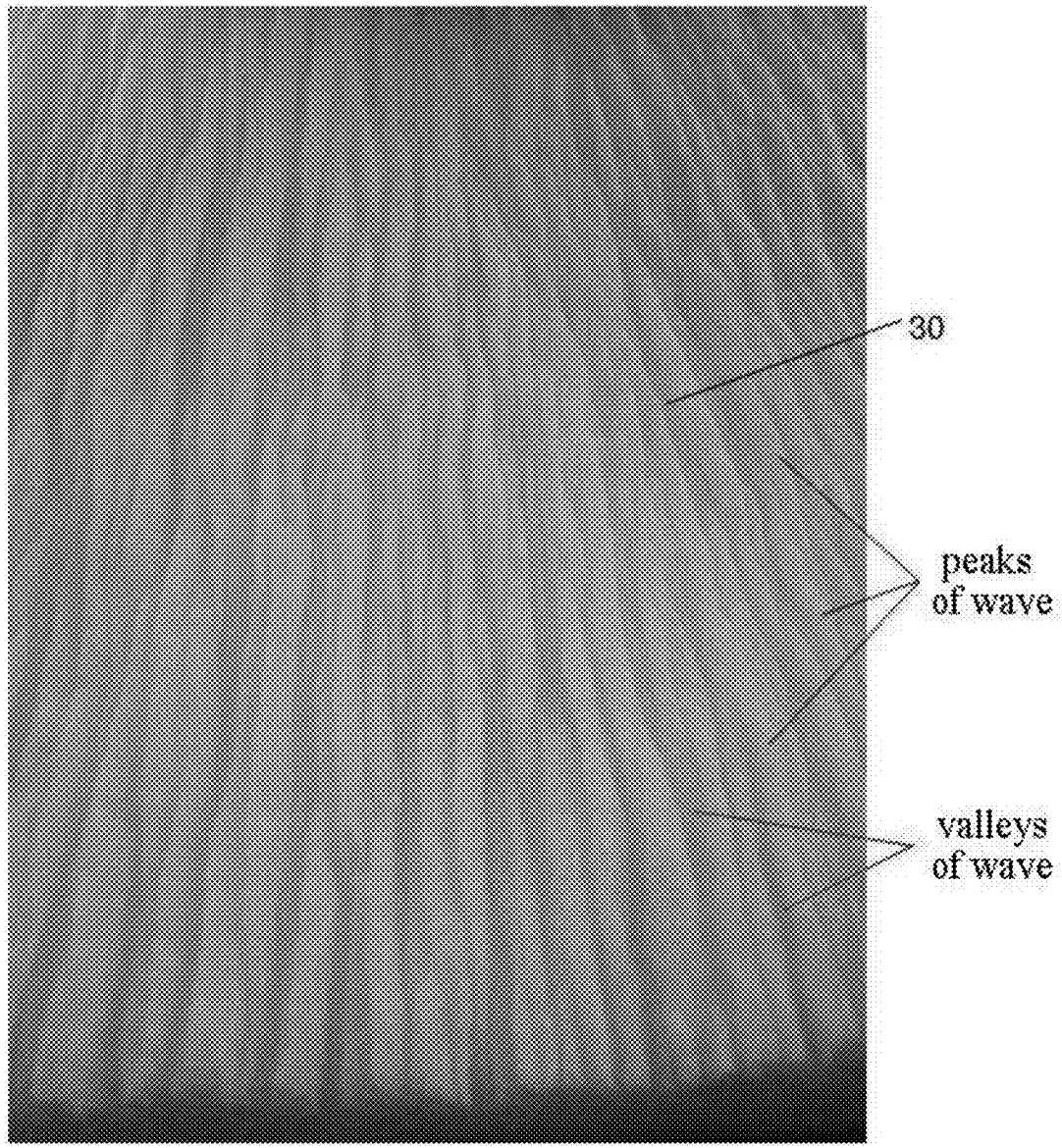

[FIG. 2c]
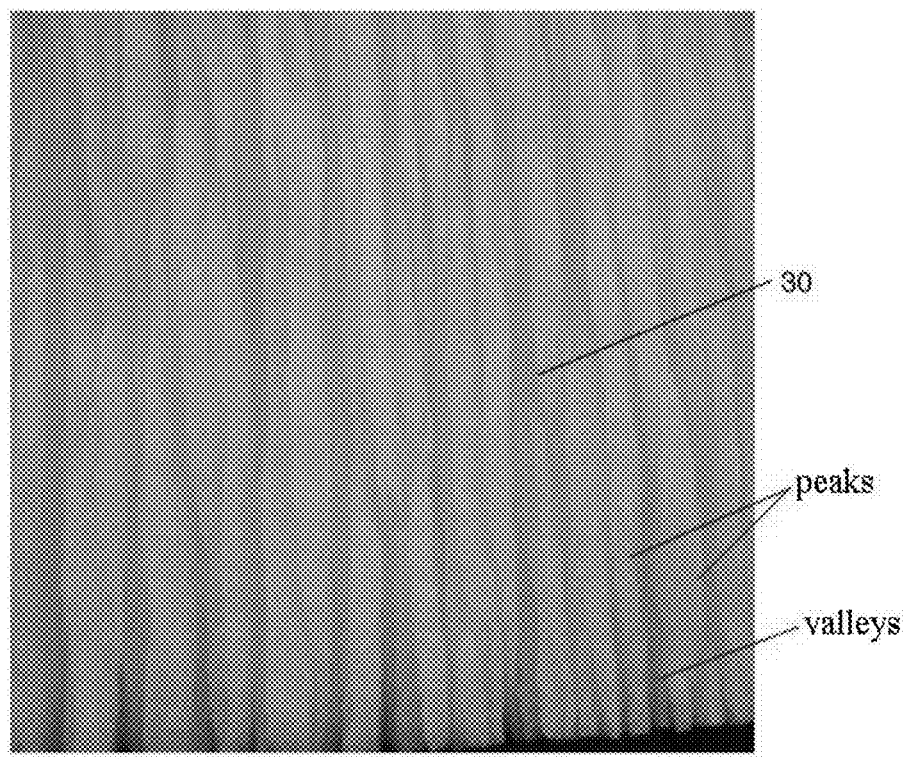

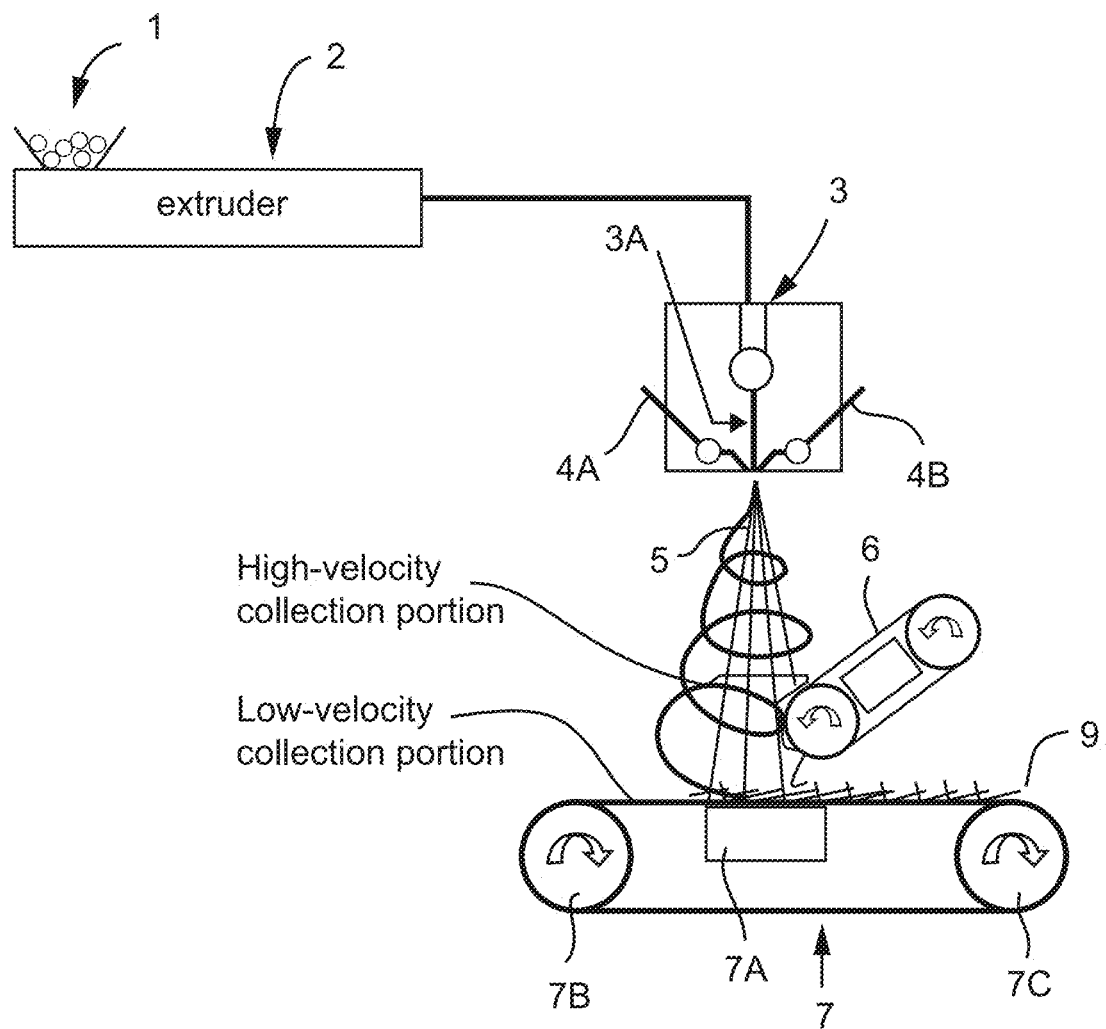
[FIG. 3]

[FIG. 4]
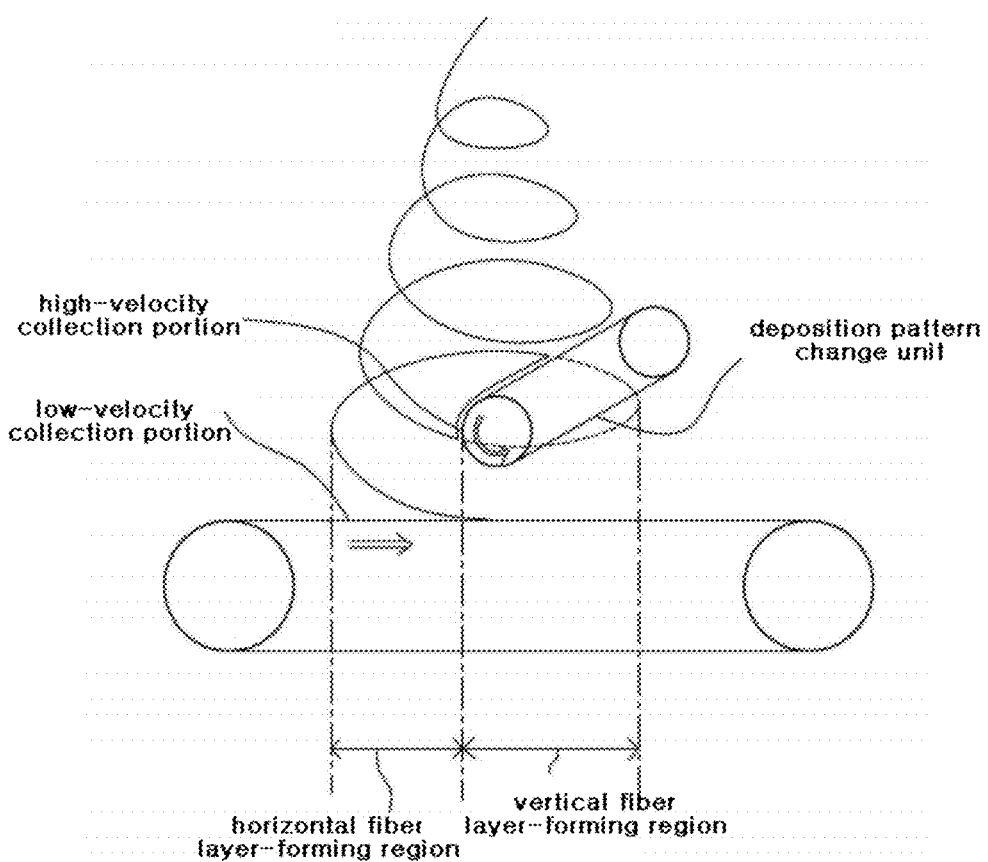

[FIG. 5]
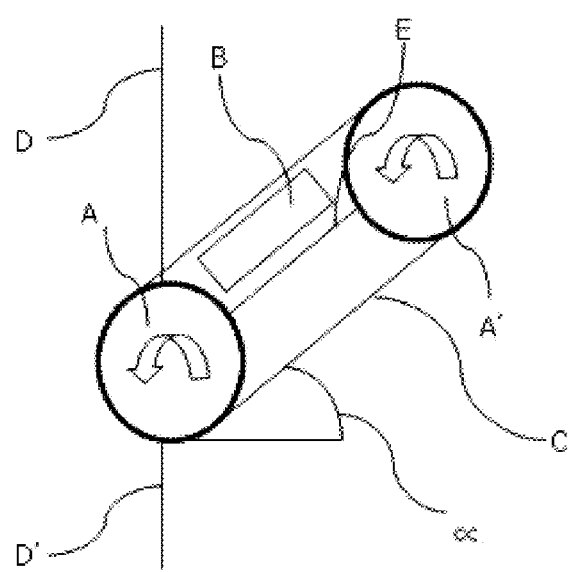

[FIG. 6]
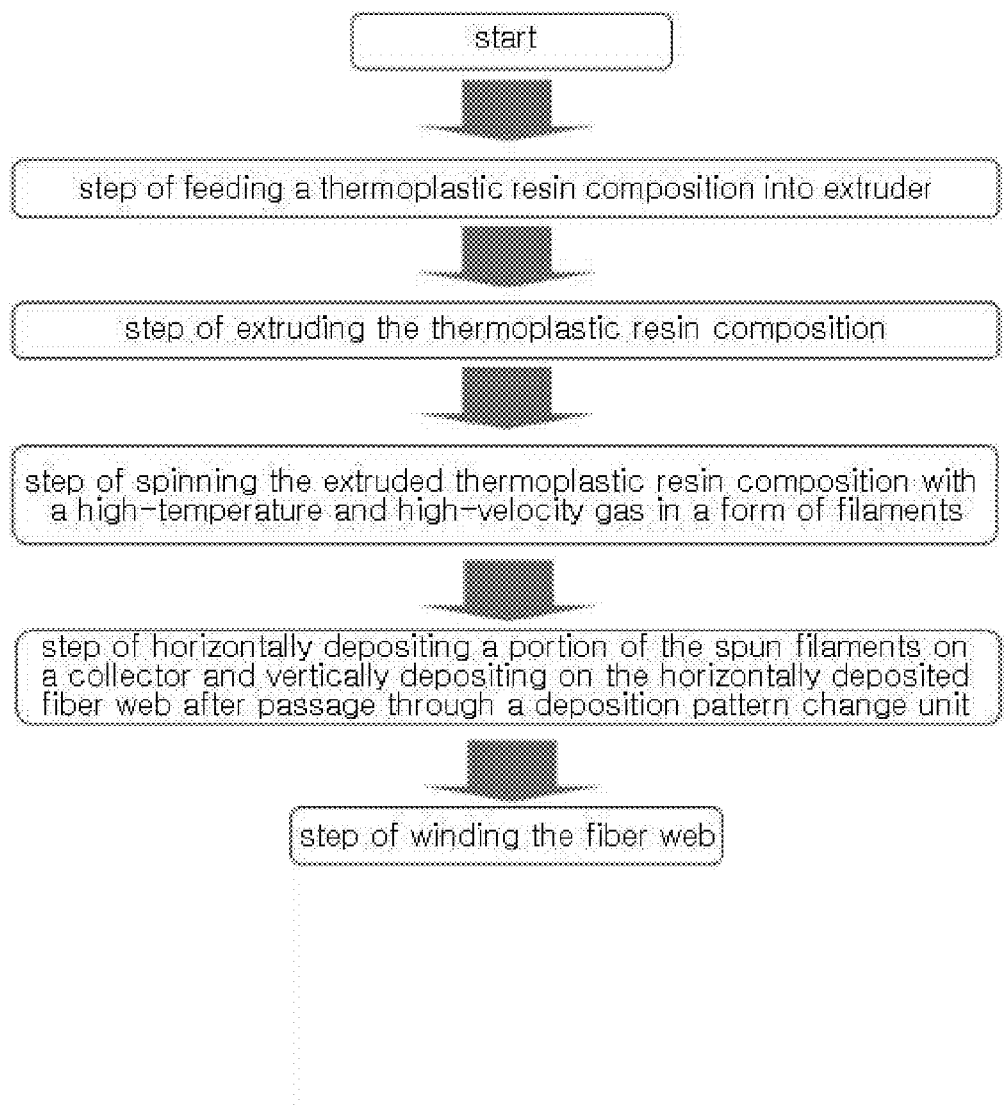

Table 1

| | Weight of microfiber (g/m²) | Weight of staple fiber (g/m²) | Total weight of fiber web (g/m²) | Weight of horizontally oriented fiber web (g/m²) | Weight of vertically oriented fiber web (g/m²) | Thickness of horizontally oriented fiber web (mm) | Thickness of vertically oriented fiber web (mm) | Total thickness of fiber web (mm) |
|---|---|---|---|---|---|---|---|---|
| Example 1 | 200 | - | 230 | 100 | 100 | 5 | 8 | 13 |
| Example 2 | 160 | 40 | 230 | 80 | 80 | 7 | 10 | 17 |
| Comparative Example 1 | 200 | - | 230 | 100 | - | 10 | - | 10 |
| Comparative Example 2 | 160 | 40 | 230 | 80 | - | 12 | - | 12 |

Table 2

| | Thickness of fiber web (mm) | Compressive modulus under heat resistant conditions (%) | Compressive modulus under moisture resistant conditions (%) | Passing mice test |
|---|---|---|---|---|
| Example 1 | 13 | 38 | 52 | Passed |
| Example 2 | 17 | 53 | 61 | Passed |
| Comparative Example 1 | 10 | 36 | 45 | Failed |
| Comparative Example 2 | 12 | 44 | 55 | Failed |

[FIG. 7]

Table 3
(results of measurement of sound absorption properties of Example 1 and Comparative Example 1)
| | 400 | 500 | 630 | 800 | 1k | 1.25k | 1.6k | 2k | 2.5k | 3.15k | 4k | 5k | 6.3k | 8k | 10k |
|---|---|---|---|---|---|---|---|---|---|---|---|---|---|---|---|
| Example 1 | 0.27 | 0.32 | 0.45 | 0.51 | 0.69 | 0.71 | 0.75 | 0.8 | 0.89 | 0.92 | 0.99 | 0.89 | 0.82 | 0.89 | 0.98 |
| Comparative Example 1 | 0.25 | 0.29 | 0.41 | 0.45 | 0.58 | 0.64 | 0.69 | 0.73 | 0.79 | 0.84 | 0.89 | 0.82 | 0.9 | 0.82 | 0.93 |
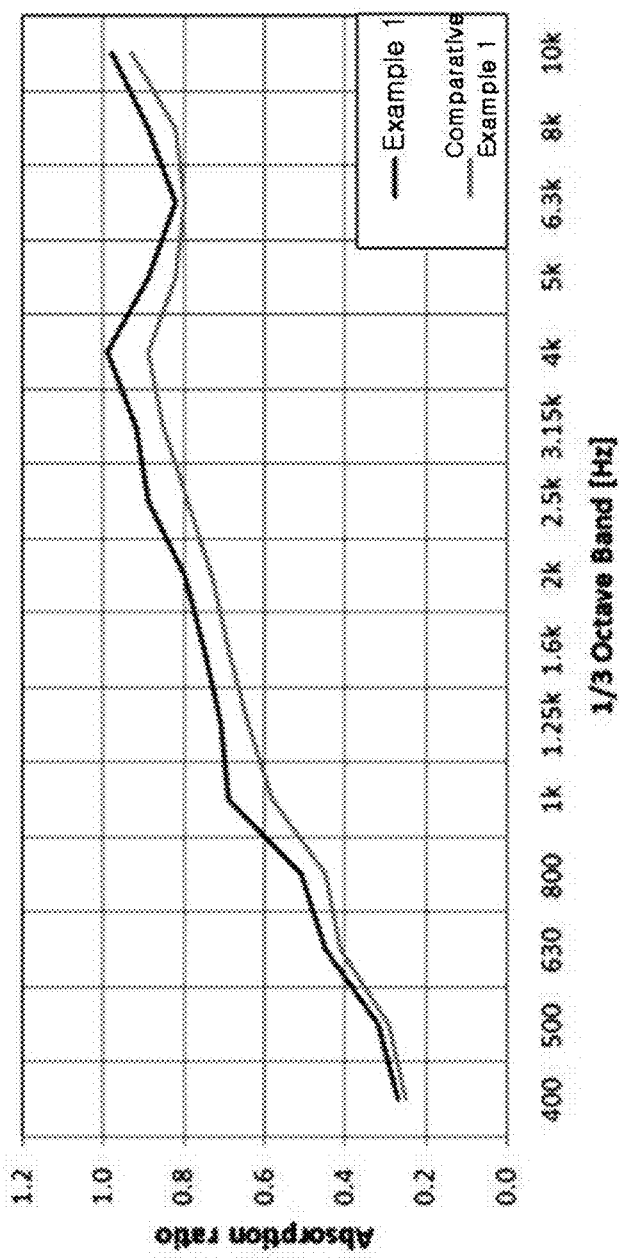
[FIG. 8]

Table 4
(results of measurement of sound absorption properties of Example 2 and Comparative Example 2)
| | 400 | 500 | 630 | 800 | 1k | 1.25k | 1.6k | 2k | 2.5k | 3.15k | 4k | 5k | 6.3k | 8k | 10k |
|---|---|---|---|---|---|---|---|---|---|---|---|---|---|---|---|
| Example 2 | 0.32 | 0.36 | 0.51 | 0.61 | 0.8 | 0.86 | 0.87 | 0.93 | 0.96 | 0.98 | 0.97 | 0.9 | 0.87 | 0.88 | 1.06 |
| Comparative Example 2 | 0.27 | 0.32 | 0.35 | 0.49 | 0.64 | 0.74 | 0.71 | 0.88 | 0.92 | 0.91 | 0.97 | 0.82 | 0.85 | 0.85 | 0.92 |
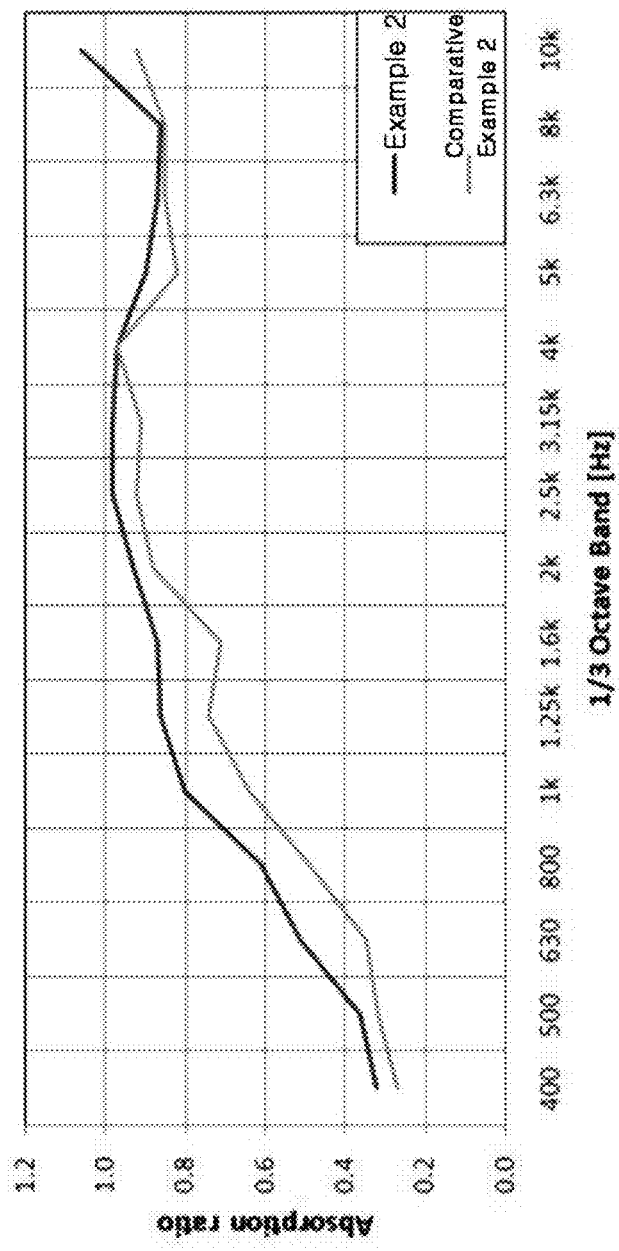
[FIG. 9]

METHOD OF PREPARING A MELTBLOWN FIBER WEB

This application is a continuation of U.S. application Ser. No. 14/439,461, filed Apr. 29, 2015, which is abandoned and the U.S. national phase of International Application No. PCT/KR2013/009354 filed 18 Oct. 2013, which designated the U.S. and claims priority to KR Patent Application No. 10-2012-0125016 filed 6 Nov. 2012, the entire contents of each of which are hereby incorporated by reference.

TECHNICAL FIELD

The present invention relates to a meltblown fiber web having a bilayer structure, and production method thereof.

BACKGROUND ART

Korean Patent Application No. 10-2010-7000497 (May 7, 2008) discloses a meltblown fiber web with staple fibers. Specifically, it discloses a porous nonwoven web comprising staple fibers intermingled with meltblown fibers, wherein the meltblown fibers comprise a bimodal mixture of intermingled microfibers and mesofibers, and wherein there are at least about five times as many microfibers as mesofibers and wherein the mesofibers comprise at least about 30% by weight of the meltblown fibers.

U.S. Pat. No. 4,1118,531 (filing date: Nov. 4, 1977; applicant: Monnesota Mining and Manufacturing Company) discloses a fibrous web comprising microfibers that average less than about 10 micrometers in diameter and crimped bulking fibers that have a percent crimp of at least about 15%, the microfibers and crimped bulking fibers being present in a weight ratio between about 9:1 and 1:9 and being randomly and thoroughly intermixed and intertangled with one another to form a resiliently compressible fiber structure that has a loft of at least 30 cm$^3$/g.

DISCLOSURE

Technical Problem

The present invention is intended to provide a meltblown fiber web which has excellent sound insulation and absorption properties against noise occurring inside internal combustion engine vehicles, and which is light in weight per unit volume so as to be able to increase the energy efficiency of vehicles, and a method for producing the meltblown fiber web.

In addition, the present invention is intended to provide a meltblown fiber web, which has improved sound absorption and soundproofing performance in the low-frequency range (200-800 Hz) of vehicle indoor noise, compared to conventional sound absorption and soundproofing materials, and the noise reduction frequency range of which can be controlled by controlling air permeability and design factors depending the needs of the user (car company), and a method for producing the meltblown fiber web.

Technical Solution

A waved meltblown fiber web according to the present invention is produced by a melt-blown method which comprises collecting meltblown microfibers by bringing them into contact with collection portions having different surface velocities.

A meltblown fiber web according to the present invention comprises: a horizontal fiber layer 10 formed by allowing a portion of meltblown microfibers to reach a low-velocity collection portion and to be deposited on the low-velocity collection portion in a horizontal orientation; a serpentine vertical fiber layer 20 formed by allowing the other portion of the meltblown microfibers to reach a high-velocity collection portion having a surface velocity higher than that of the low-velocity collection portion; and a waved layer 30 formed by entanglement of the microfibers at the top of the vertical fiber layer 20, the waved layer forming the uppermost portion of the fiber web.

Advantageous Effects

In meltblown fiber webs and production methods thereof, developed to date, there is a limit to the production of a fiber web which has a lower density, is bulky, and has a dense internal structure, and the compressive modulus and sound absorption performance of the meltblown fiber webs are also not satisfactory. An object of the present invention is to overcome the existing limitation, and the present inventors have conducted studies for many years, and as a result, have developed a meltblown fiber web which has a lower density, is more bulky, and has a dense internal structure and increased compressive modulus and sound absorption performance, compared to conventional products, and an easy method for producing the meltblown fiber web. The meltblown fiber web according to the present invention is more bulky and has excellent elasticity and a dense internal structure, compared to conventional meltblown fiber webs, and the properties thereof can be more easily controlled.

According to the present invention, it is possible to produce a meltblown fiber web which is more bulky and has excellent elasticity and a dense internal structure. In addition, meltblown fiber webs having various properties can be easily produced by changing the deposition pattern of meltblown microfibers by the manufacturer to control the bonding strength and twisting patterns of the microfibers, the elasticity, density and volume of the fiber web, and the like.

Specifically, the effects of the present invention are as follows.

1. According to the present invention, a meltblown fiber web having lower density, larger volume and higher compressive modulus can be provided to the market.

2. A meltblown fiber web having better sound absorption performance and a denser internal structure can be provided to the marker. In addition, a meltblown fiber web, which has a denser structure leading to an enhanced anti-mite property, can be provided to the market.

3. Meltblown fiber webs having various densities, elasticities and internal structures can be easily produced by controlling the pattern and deposition amount of a horizontally oriented meltblown microfiber layer and a vertically oriented meltblown microfiber layer. In other words, meltblown fiber webs having various densities, elasticities and internal structures can be easily produced by repeatedly depositing a horizontally oriented meltblown microfiber layer and a vertically oriented meltblown microfiber layer.

DESCRIPTION OF DRAWINGS

FIGS. 1a and 1b show the cross-sectional structure of a waved meltblown fiber web according to an embodiment of the present invention.

FIGS. 2a, 2b and 2c show the structure of the top of a waved meltblown fiber web according to an embodiment of the present invention.

FIG. 3 shows a method for producing a waved meltblown fiber web according to an embodiment of the present invention.

FIG. 4 shows the control of the ratio between a horizontal fiber layer and a vertical fiber layer in a method for producing a waved meltblown fiber web according to an embodiment of the present invention.

FIG. 5 shows an apparatus for producing a waved meltblown fiber web according to an embodiment of the present invention.

FIG. 6 is a flow chart showing a method for producing a waved meltblown fiber web according to an embodiment of the present invention.

FIG. 7 shows the results of tests for Example 1, Example 2, Comparative Example 1 and Comparative Example 2.

FIG. 8 shows the results of testing the sound absorption properties of Example 1 and Comparative Example 1.

FIG. 9 shows the results of testing the sound absorption properties of Example 2 and Comparative Example 2.

MODE FOR INVENTION

Hereinafter, a waved meltblown fiber web according to an embodiment of the present invention and a method for producing the same will be described in detail with reference to the accompanying drawings. FIGS. 1a and 1b show the cross-sectional structure of a waved meltblown fiber web according to an embodiment of the present invention; FIGS. 2a, 2b and 2c show the structure of the top of a waved meltblown fiber web according to an embodiment of the present invention; FIG. 3 shows a method for producing a waved meltblown fiber web according to an embodiment of the present invention; FIG. 4 shows the control of the ratio between a horizontal fiber layer and a vertical fiber layer in a method for producing a waved meltblown fiber web according to an embodiment of the present invention; FIG. 5 shows an apparatus for producing a waved meltblown fiber web according to an embodiment of the present invention; FIG. 6 is a flow chart showing a method for producing a waved meltblown fiber web according to an embodiment of the present invention; FIG. 7 shows the results of tests for Example 1, Example 2, Comparative Example 1 and Comparative Example 2; FIG. 8 shows the results of testing the sound absorption properties of Example 1 and Comparative Example 1; and FIG. 9 shows the results of testing the sound absorption properties of Example 2 and Comparative Example 2.

The present invention relates to a fiber web produced by allowing meltblown fibers to reach collection portions having different surface velocities (the velocities of regions to which the meltblown microfibers come) so as to form structures having dual properties. Herein, the collection portions include a high-velocity collection portion and a low-velocity collection portion, and "high-velocity" and "low-velocity" have relative concepts, and are intended to mean that the surfaces (the surfaces to which the fibers come) have different velocities. In the present invention, the high-velocity collection portion or the low-velocity collection portion is intended to include a surface that is rotated by a circular roller, or a belt-type collection portion that moves in a plane. As used herein, the term "collection portion" refers to a unit having a portion to which the meltblown microfibers come, and means a region which moves while the meltblown fibers are deposited thereon.

In an embodiment of the present invention as shown in FIG. 3, the left side of a collector 7 functions as the low-velocity collection portion, and a deposition pattern change unit 6 functions as the high-velocity collection portion. Herein, terms "high velocity" and "low velocity" have relative concepts, and are merely intended to mean that the surface velocity of the high-velocity collection portion is higher than the surface velocity of the low-velocity collection portion. In addition, these terms "high velocity" and "low velocity" do not mean quantitative absolute values, and it does not appear that these terms make the present invention obscure.

As shown in FIGS. 1a to 4, the waved meltblown fiber web according to the present invention is characterized in that it is produced by a method in which meltblown microfibers are collected by bringing them into contact with collection portions having different surface velocities.

As shown in FIGS. 1a to 2c, the waved meltblown fiber web according to the present invention comprises a horizontal fiber layer 10, a vertical fiber layer 20 and a waved layer 30. In the waved meltblown fiber web according to the present invention, a portion of meltblown microfibers reach a low-velocity collection portion on which the microfibers are deposited in a horizontal orientation to form a horizontal fiber layer 10, and the other portion of meltblown microfibers reach a high-velocity collection portion having a surface velocity higher than that of the low-velocity collection portion to form a serpentine vertical fiber layer 20. The fibers at the top of the vertical fiber layer 20 are entangled with one another to form a waved layer 30 that forms the uppermost portion of the fiber web.

In the waved meltblown fiber web according to the present invention, as shown in FIG. 2a, the waved layer 30 is preferably configured such that the lines defined by the peaks and valleys of the wave are arranged at irregular intervals in a horizontal direction (in anterioposterial direction and lengthways).

In the waved meltblown fiber web according to the present invention, as shown in FIG. 2b, the waved layer 30 is preferably separated on the whole from the vertical fiber layer 20 when one side of the waved layer 30 is pulled.

The waved meltblown fiber web according to the present invention preferably further comprises staple fibers which serve to intertangle the meltblown microfibers together. As shown in FIG. 1b, the waved meltblown fiber web preferably further comprises a covering fabric 40 covering the meltblown fiber web, and the covering fabric 40 is a nonwoven fabric made of spunbond fibers.

In the waved meltblown fiber web according to the present invention, the ratio of the thickness of the horizontal fiber layer 10 to the thickness of the vertical fiber layer 20 is preferably 1:1 to 1:9 in a state in which an external compressive load is not applied to the fiber web and the fiber web is freely spread out, or in a state in which an external compressive load is not applied to the fiber web and the fiber web is covered with the covering fabric 40 and is freely spread out, or in a state in which the fiber web is pulled up upwardly by an external force 0.1-2 times the total thickness of the fiber web in a load-free state.

In the waved meltblown fiber web according to the present invention, the content of the staple fibers in the multilayer meltblown fiber web is preferably 5-90 wt % based on the total weight of the meltblown fiber web in a state in which the meltblown fiber web is not covered with the covering fabric 40. The staple fibers are preferably mesofibers such as olefinic polypropylene (PP) fibers, polyethylene (PE) fibers, polyethylene terephthalate (PET)

fibers, or amide-based nylon fibers. The staple fibers are mesofibers either selected from the group consisting of synthetic polymer fibers, including olefinic polypropylene (PP) fibers, polyethylene (PE) fibers, polyethylene terephthalate (PET) fibers, amide-based nylon fibers, glass fibers, and carbon-based fibers, or selected from the group consisting of natural polymer fibers, including cotton fibers, hemp fibers and pulp fibers. In addition, in the present invention, the staple fibers are mesofibers selected from among staple fibers, hollow fibers, multi-lobal fibers, and electrostatically treated staple fibers.

As shown in FIGS. 3, 4 and 6, the method of producing the meltblown fiber web by the melt-blown method according to the present invention is characterized in that meltblown microfibers are collected by bringing them into contact with collection portions having different surface velocities.

As shown in FIGS. 3, 4 and 6, the method of producing the meltblown fiber web by the melt-blown method preferably comprises the steps of: (S1) feeding a thermoplastic resin composition into an extruder; (S2) extruding the thermoplastic resin composition; (S3) spinning the extruded thermoplastic resin composition with a high-temperature and high-pressure gas in the form of filaments; (S4) depositing a portion of the spun filaments on a low-velocity collection portion in a single orientation and in a predetermined pattern to form a horizontal fiber layer 10, and bringing the other portion of the spun filaments into contact with a high-velocity collection portion to form a vertical fiber layer 20; and (S5) winding the produced meltblown fiber web.

As used herein, the term "thermoplastic resin" refers to a resin that can repeatedly be melted at a temperature higher than the melting point of the polymer resin and solidified by cooling. The thermoplastic resins can be divided, according to the degree of crystallization, crystalline thermoplastic resins and amorphous thermoplastic resins. The crystalline thermoplastic resins include polyethylene, polypropylene, nylon and the like, and the amorphous thermoplastic resins include polyvinyl chloride, polystyrene and the like.

As used herein, the term "polyolefin" is intended to mean any of a series of saturated open-chain polymeric hydrocarbons composed only of carbon and hydrogen atoms. Typical polyolefins include polyethylene, polypropylene, polymethylpentene, and various combinations of ethylene, propylene and methylpentene monomers.

The term "polypropylene" as used herein is intended to encompass not only homopolymers of propylene, but also copolymers wherein at least 40% of the recurring units are propylene units.

The term "polyester" as used herein is intended to embrace polymers wherein at least 85% of the recurring units are condensation products of dicarboxylic acids and dihydroxy alcohols with polymer linkages created by formation of ester units. This includes aromatic, aliphatic, saturated, and unsaturated di-acids and di-alcohols. The term "polyester" as used herein also includes copolymers, blends, and modifications thereof. A common example of a polyester is poly(ethylene terephthalate) (PET) which is a condensation product of ethylene glycol and terephthalic acid.

The term "meltblown microfibers" or "meltblown filaments" as used herein means the fibers or filaments formed by extruding a molten processible polymer through a plurality of fine capillaries into a high-temperature and high-velocity gas. Herein, the capillaries may have various shapes, including polygonal shapes such as circular, triangular and square shapes, and a star shape. In addition, for example, the high-temperature and high-velocity gas can attenuate the filaments of molten thermoplastic polymer material to reduce their diameter to about 0.3-10 µm. The meltblown fibers may be discontinuous fibers or continuous fibers. 70-80% or 90% of the meltblown microfibers may have a diameter of 10 µm or less. Further, 10%, 20% or 30% of the meltblown microfibers may have a diameter of 3 µm or less.

As used herein, the term "spunbond fibers" means a fiber web produced by extruding a molten polymer material through a plurality of fine capillaries to form filaments and drawing the filaments through high-temperature tubes. The spunbond fibers are continuous in the lengthwise direction of the filaments, and the filaments have an average diameter greater than about 5 µm.

Example 1

A meltblown fiber web was produced according to the production method of the present invention as shown in FIG. 3. Specific conditions for the production of the meltblown fiber web are as follows.

A thermoplastic resin composition 1 comprising 99.8 wt % of homopolypropylene H7914 polymer resin (LG Chemical Ltd.) having a melt index of 1400 (230° C., g/10 min), 0.1 wt % of UV stabilizer Tinuvin 622 (Ciba Special Chemical) and 0.1 wt % of thermal stabilizer Irganox 1010 was fed into an extruder 2.

The single extruder having a length/dimension ratio of 1/28 was rotated at 80 rpm to knead, heat and extrude the thermoplastic resin composition 1. Next, the fibers were spun in the direction of collectors through 32 orifices (orifice diameter: 0.2 mm) per inch in a spinning die having a diameter of 2 m. At the same time, the fibers were allowed to collide with a high-temperature and high-velocity gas injected from high-temperature and high-velocity gas injection holes 4A and 4B disposed symmetrically on the left and right sides in the spinning die 3, thereby producing meltblown microfibers.

The vertical distance between the spinning die 3 and the collector 7 was set at 70 cm, and the surface velocity of the collector 7 was 2.5 m/min, and under such conditions, 200 g/m$^2$ of meltblown fibers were produced. 50 wt % of the meltblown microfibers 5 spun from the spinning die 3 were transferred directly to the collector 7 without passing through a deposition pattern change unit 6, and was deposited on the collector in a horizontal orientation. Meanwhile, 50 wt % of the meltblown microfibers 5 spun from the spinning die 3 were passed through the deposition pattern change unit 6 of the present invention to change the orientation of the microfibers 5 to a vertical orientation and was deposited on a top of the horizontally oriented meltblown fiber web in a vertical orientation.

Both sides of 200 g/m$^2$ of the meltblown fiber web produced as described above were laminated with 15 g/m$^2$ of a spunbond nonwoven fabric, thereby producing a meltblown fiber web having a total weight of 230 g/m$^2$.

The operating conditions of the deposition pattern change unit used in this Example are as follows. The deposition pattern change unit used in this Example was composed of a steel roll A having a length of 2,200 mm and a diameter of 100 pi, a steel roll A' having the same size as that of the steel roll A, and a stainless steel mesh belt C connected to the rolls and having a diameter of 2,100 mm. The distance E between the steel roll A and the steel roll A' was 400 mm, and the steel roll A and the steel roll A' were rotated in the same direction, at the same velocity, as shown in FIG. 5. In addition, the inside of the stainless steel mesh belt C of the deposition pattern change unit 6 includes the absorption member B configured to absorb the high-temperature and high-pressure gas injected from the spinning die. The distance D between the deposition pattern change unit 6 and the spinning die 3 was set at 35 cm, and the distance D' between the deposition pattern change unit 6 and the collector 7 was set at 25 cm. In addition, the deposition pattern change unit 6 was disposed at a position at which it could collect 50 wt % of the meltblown microfibers 5 spun from the spinning die 3.

FIGS. 1a and 1b are cross-sectional views of the meltblown fiber web produced in Example 1. The thickness, weight, compressive modulus and sound absorption coefficient of the meltblown fiber web produced in the Example were measured. The thickness of the fiber web was measured in accordance with 5.3 of Internal Standard ISO 9073-2. For measurement of the weight, the weights of five samples having a size of 100 mm×100 mm were measured and averaged. Then, the average value was expressed as a representative value.

The compressive modulus of the fiber web was measured in accordance with 4.8 of MS341-17, and the sound absorption performance of the fiber web was measured in accordance with the reverberation chamber method of the technical standard GM 14177. In addition, a mite avoidance test for the fiber web was performed in accordance with the passing test method of FC-TM-21. The thickness (10HD) and weight of the horizontally deposited meltblown fiber web (10AH) as shown in FIG. 1a are 5 mm and 100 g/m$^2$, respectively. In addition, the thickness (10VD) and weight of the horizontally deposited meltblown fiber web (10AV) are 8 mm and 100 g/m$^2$, respectively.

Example 2: Fiber Web Including Staple Fibers

A thermoplastic resin composition 1 comprising 99.8 wt % of homopolypropylene H7914 polymer resin (LG Chemical Ltd.) having a melt index of 1400 (230° C., g/10 min), 0.1 wt % of UV stabilizer Tinuvin 622 (Ciba Special Chemical) and 0.1 wt % of thermal stabilizer Irganox 1010 was fed into an extruder 2.

The single extruder having a length/dimension ratio of 1/28 was rotated at 80 rpm to knead, heat and extrude the thermoplastic resin composition 1. Next, the fibers were spun in the direction of collectors through 32 orifices (orifice diameter: 0.2 mm) per inch in a spinning die having a diameter of 2 m. At the same time, the fibers were allowed to collide with a high-temperature and high-velocity gas injected from high-temperature and high-velocity gas injection holes 4A and 4B disposed symmetrically on the left and right sides in the spinning die 3, thereby producing meltblown microfibers.

A staple fiber feeding unit was provided at a distance of 10 cm from the spinning die 3 in the direction of the collector 7, and polypropylene staple fibers having a diameter of 40 μm and an average length of 39 mm were added to the meltblown microfibers 5 in an amount of 20 wt % based on the total weight of the fiber web. The vertical distance between the spinning die 3 and the collector 7 was set at 70 cm, and the surface velocity of the collector 7 was 2 m/min, and under such conditions, 200 g/m$^2$ of meltblown fibers were produced. 50 wt % of the meltblown microfibers 5 spun from the spinning die 3 were transferred directly to the collector 7 without passing through a deposition pattern change unit 6, and was deposited on the collector in a horizontal orientation. Meanwhile, 50 wt % of the meltblown microfibers 5 spun from the spinning die 3 were passed through the deposition pattern change unit 6 of the present invention to change the orientation of the microfibers 5 to a vertical orientation and was deposited on a top of the horizontally oriented meltblown fiber web in a vertical orientation.

Both sides of 200 g/m$^2$ of the meltblown fiber web produced as described above were laminated with 15 g/m$^2$ of a spunbond nonwoven fabric, thereby producing a meltblown fiber web having a total weight of 230 g/m$^2$.

Comparative Example 1

A meltblown fiber web was produced in the same manner as described in Example 1, except that the deposition pattern change unit 6 of the present invention was not used and the meltblown microfibers 5 spun from the spinning die 3 were all deposited on the collector in a horizontal orientation. Both sides of the meltblown fiber web were laminated with 15 g/m$^2$ of a spunbond nonwoven fabric (covering fabric), thereby producing a meltblown fiber web having a total weight of 230 g/m$^2$.

Comparative Example 2

A meltblown fiber web was produced in the same manner as described in Example 2, except that the deposition pattern change unit 6 of the present invention was not used and the meltblown microfibers 5 spun from the spinning die 3 were all deposited on the collector in a horizontal orientation. Both sides of the meltblown fiber web were laminated with 15 g/m$^2$ of a spunbond nonwoven fabric (covering fabric), thereby producing a meltblown fiber web having a total weight of 230 g/m$^2$.

Comparison

FIG. 7 shows the results of tests for Example 1, Example 2, Comparative Example 1 and Comparative Example 2; FIG. 8 shows the results of testing the sound absorption properties of Example 1 and Comparative Example 1; and FIG. 9 shows the results of testing the sound absorption properties of Example 2 and Comparative Example 2. Table 1 in FIG. 7 shows the results of measuring the thicknesses and weights of the meltblown fiber webs produced in Example 1, Example 2, Comparative Example 1 and Comparative Example 2. Table 2 in FIG. 7 shows the results of measuring the compressive modulus the fiber webs of Example 1, Example 2, Comparative Example 1 and Comparative Example 2 under heat resistant and moisture resistant conditions, and the results of performing the anti-fungal test for the fiber webs.

From a comparison between the measurement results for the fiber webs of Example 1, Example 2, Comparative Example 1 and Comparative Example 2, as shown Tables 1 and 2 in FIG. 7, the effects of the present invention can be clearly found. It can be seen that, when the vertically oriented meltblown fiber web was deposited on a top of the horizontally deposited meltblown fiber web using the deposition pattern change unit of the present invention, the thickness per weight was increased by 30-41% compared to that of the fiber web composed only of the horizontally oriented fiber web. From a comparison between the measurement results for the compressive modulus of Example 1 and Comparative Example 1, it can be seen that the compressive modulus of the meltblown fiber web composed of a combination of the horizontally oriented fiber web and the vertically oriented fiber web was increased by 46% under heat resistant conditions and 10% under moisture resistant conditions, compared to the meltblown fiber web composed only of the horizontally oriented fiber web.

In addition, from a comparison between the measurement results for the compressive modulus of Example 2 and Comparative Example 2, in FIG. 7, it can be seen that the compressive modulus of the meltblown fiber web composed of a combination of the horizontally oriented fiber web and the vertically oriented fiber web was increased by 20% under heat resistant conditions and 10% under moisture resistant conditions, compared to the meltblown fiber web composed only of the horizontally oriented fiber web. Herein, it can be seen that the difference in compressive modulus under heat resistant conditions between Example 1 and Comparative Example 1 was significantly greater than the difference in compressive modulus under heat resistant conditions between Example 2 and Comparative Example 2. This appears to be because the addition of the polypropylene staple fibers increased the compressive modulus under heat conditions.

In addition, as can be seen in FIG. 7, the fiber webs of Example 1 and Example 2 did not pass mites in the mite test, but the fiber webs of Comparative Examples 1 and 2 failed in the mite test. This is because the internal structure of the meltblown fiber web composed of a composition of the horizontally deposited structure and the vertically deposited structure according to the present invention was denser than the internal structure of the fiber webs of Comparative Examples 1 and 2 composed only of the horizontally deposited structure.

Table 3 in FIG. 8 shows the results of measuring the sound absorption performance of the fiber webs of Example 1 and Comparative Example 1, and Table 4 in FIG. 9 shows the results of measuring the sound absorption performance of the fiber webs of Example 2 and Comparative Example 2. As can be seen from the test results, the fiber web of Example 1 showed excellent sound absorption performance compared to the fiber web of Comparative Example 1, and the fiber web of Example 2 showed excellent sound absorption performance compared to the fiber web of Comparative Example 2. This is because the meltblown fiber web composed of a composition of the horizontally deposited structure and the vertically deposited structure according to the present invention had a denser internal structure and was more bulky, compared to the fiber webs of Comparative Examples 1 and 2 composed only of the horizontally deposited structure. Taken the results of the Examples and the Comparative Examples together, it can be seen that the use of the method for producing the meltblown fiber web according to the present invention enables the production of a meltblown fiber web, which is more bulky and has excellent compressive modulus and a denser internal structure, compared to meltblown fiber webs produced by conventional production methods.

As can be seen in FIGS. 7 to 9, the sound absorption and soundproofing properties of the meltblown fiber web of the present invention in an important frequency region of vehicle noise are improved.

Although the preferred embodiments of the present invention have been disclosed, the scope of the present invention is not limited to these embodiments, and covers various modifications and changes within the equivalent scope of the appended claims.

It should be noted that reference numerals set forth in the appended claims are merely intended to aid in the understanding of the present invention, and are not intended to limit interpretation of the scope of the claims.

DESCRIPTION OF REFERENCE NUMERALS USED IN DRAWINGS

10: horizontal fiber layer;
20: vertical fiber layer;
30: waved layer;
40: covering fabric.

The invention claimed is:

1. A method of absorbing sound comprising incorporating a waved meltblown fiber web into sound insulation or soundproofing material,
wherein the waved meltblown fiber web is produced by a melt-blown method, and comprises a horizontal fiber layer, a vertical fiber layer formed on the horizontal fiber layer, and a waved layer forming an uppermost portion of the vertical fiber layer
the horizontal fiber layer is formed by allowing a portion of meltblown microfibers to reach a low-velocity collection portion and to be deposited on the low-velocity collection portion in a horizontal orientation hereby the microfibers are in a horizontal orientation;
the vertical fiber layer is formed in a serpentine shape of vertically oriented microfibers and deposited on the horizontal fiber layer after the horizontal fiber layer is deposited, by allowing the other portion of the meltblown microfibers to reach a high-velocity collection portion having a surface velocity higher than that of the low-velocity collection portion; and
the waved layer is formed by entanglement of the microfibers at a top of the vertical fiber layer and forms the uppermost portion of the fiber web;
the horizontal fiber layer and the vertical fiber layer being present in thicknesses such that a ratio of the thickness of the horizontal fiber layer to the thickness of the vertical fiber layer being 1:1 to 1:9 in a state in which no external compressive load is applied to the fiber web and the fiber web is freely spread out, or in a state in which no external compressive load is applied to the fiber web and the fiber web is covered with a covering fabric and is freely spread out, or in a state in which the fiber web is pulled up upwardly by an external force by 0.1-2 times the total thickness of the fiber web in a load-free state;
wherein 70% to 90% of the meltblown microfibers have a diameter of 10 μm or less and 10% to 30% of the meltblown microfibers have a diameter of 3 μm or less; and
wherein the waved meltblown fiber web is capable of absorbing sound ranging from 400 Hz to 10,000 Hz.

2. The method of claim 1, wherein the waved layer is formed such that lines defined by peaks and valleys of the wave of the waved layer are arranged at irregular intervals in a horizontal direction.

3. The method of claim 1, wherein the waved meltblown fiber web further comprises staple fibers which serve to intertangle the meltblown microfibers together.

4. The method of claim 1, wherein the waved meltblown fiber web further comprises a covering fabric covering the meltblown fiber web, in which the covering fabric is a nonwoven fabric made of spunbond fibers.

5. The method of claim 3, wherein the staple fibers are present in an amount of 5-90 wt % based on the total weight of the waved meltblown fiber web in a state in which the fiber web is not covered with the covering fabric.

6. The method of claim 5, wherein the staple fibers are either synthetic polymer fibers selected from the group consisting of olefinic fibers, polyethylene terephthalate fibers, nylon fibers, glass fibers, and carbon-based fibers, or natural polymer fibers selected from the group consisting of cotton fibers, hemp fibers and pulp fibers; or the staple fibers are selected from among hollow fibers, multi-lobal fibers, and electrostatically treated staple fibers.

7. The method of claim 6, wherein olefinic fibers are polypropylene fibers or polyethylene fibers.

* * * * *